United States Patent
Toda et al.

(10) Patent No.: US 6,505,409 B2
(45) Date of Patent: *Jan. 14, 2003

(54) INCLINOMETER

(75) Inventors: Risaku Toda, Plano, TX (US);
Masayoshi Esashi, Sendai (JP)

(73) Assignee: Ball Semiconductor, Inc., Allen, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/449,882

(22) Filed: Nov. 30, 1999

(65) Prior Publication Data

US 2002/0073563 A1 Jun. 20, 2002

(30) Foreign Application Priority Data

May 31, 1999 (JP) .............................. 11-151872

(51) Int. Cl.[7] .............................................. G01C 15/10
(52) U.S. Cl. ............................ 33/366.24; 33/366.25; 33/366.11; 33/396
(58) Field of Search ............................. 33/365, 366.11, 33/366.12, 366.23, 366.24, 366.25, 366.26, 366.27, 391, 396, 398, DIG. 3; 340/440, 429, 689; 200/61.45 R, 61.52, 61.46; 73/514.36

(56) References Cited

U.S. PATENT DOCUMENTS

| | | | | |
|---|---|---|---|---|
| 3,611,345 A | * | 10/1971 | Pintell | 340/571 |
| 3,701,093 A | * | 10/1972 | Pick | 340/440 |
| RE31,473 E | | 12/1983 | Kilby et al. | |
| 4,493,155 A | * | 1/1985 | Comeau et al. | 33/366.26 |
| 5,010,893 A | * | 4/1991 | Sholder | 200/61.45 R |
| 5,168,138 A | * | 12/1992 | Evans | 200/61.45 R |
| 5,450,676 A | * | 9/1995 | Thornsberry | 33/396 |
| 5,462,639 A | | 10/1995 | Matthews et al. | |
| 5,602,429 A | * | 2/1997 | Scgiebelhuth | 340/429 |
| 5,726,480 A | | 3/1998 | Pister | |
| 5,774,055 A | * | 6/1998 | Pomerantz | 340/689 |
| 5,808,254 A | * | 9/1998 | Wu | 200/61.45 R |
| 6,148,669 A | * | 11/2000 | Roest | 33/366.25 |
| 6,198,396 B1 | * | 3/2001 | Frank | 340/689 |

FOREIGN PATENT DOCUMENTS

| | | | | |
|---|---|---|---|---|
| JP | 60061612 A | * | 4/1985 | 33/366.12 |
| JP | 02-119241 | | 10/1988 | |

* cited by examiner

Primary Examiner—Diego Gutierrez
Assistant Examiner—Mirellys Jagan
(74) Attorney, Agent, or Firm—Haynes & Boone, LLP

(57) ABSTRACT

An inclinometer comprising a spherical mass, a spherical shell having a reference axis and surrounding said spherical mass and a plurality of electrodes mounted on the spherical inner surface of said spherical shell, said inclinometer applied to detect the inclination angle of said reference axis by the output signal of said electrodes.

19 Claims, 8 Drawing Sheets

INCLINOMETER

This application claims the priority of Japanese Application No. P11-151872 filed on May 31, 1999.

FIELD OF THE INVENTION

The present invention relates to an inclinometer or clinometer for detecting an inclination angle relative to a horizontal plane or a vertical axis. Particularly, the present invention relates to a micro inclinometer or clinometer for the use of robotics, virtual reality apparatus or the like.

BACKGROUND OF THE INVENTION

Recently, in the field of mechano-electronics including robotics, virtual reality or the like, various products have been developed. These products use very small sensors. These sensors include gyro, accelerator, inclinometer or the like. Conventionally, various type of inclinometers utilizing various principles have been used. Typically, such an inclinometer that has a liquid containing vessel and is applied to detect inclination angle by detecting the inclination angle of the liquid surface has been known and used.

However, it has been difficult to make such a conventional inclinometer in very small size in order to be used in many ways for mechano-electronics products. Particularly, in case of inclinometers of the type utilizing the inclination of liquid surface, it has been difficult to make it in small size.

Accordingly, it is an object of the present invention to provide an inclinometer of a very small size.

SUMMARY OF THE INVENTION

According to the present invention, there is provided an inclinometer comprising a spherical mass, a spherical shell surrounding said spherical mass and having a reference axis and a plurality of electrodes mounted on the spherical inner surface of said spherical shell, said inclinometer applied to detect the inclination angle of said reference axis by the output signal of said electrodes.

Accordingly, the inclinometer of the present invention can be made in very small size.

According to the present invention, the inclination azimuth of said reference axis is detected by the output signal of said electrodes. Said electrodes comprises six electrodes each positioned along orthogonal three axes. Said electrodes are positioned at points corresponding to surfaces of a regular polyhedron. Said electrodes are formed as meshed electrodes each being separated from one another by latitudinal partition lines and longitudinal partition lines. Said inclination angle of reference axis is calculated by using the electrostatic capacity between said spherical mass and the respective electrode. A closed circuit is formed by a contact between said spherical mass and said electrodes and said inclination angle of reference axis is calculated by detecting such electrodes that form said closed circuit.

BEST MODES FOR CARRYING OUT THE INVENTION

Figure 1:
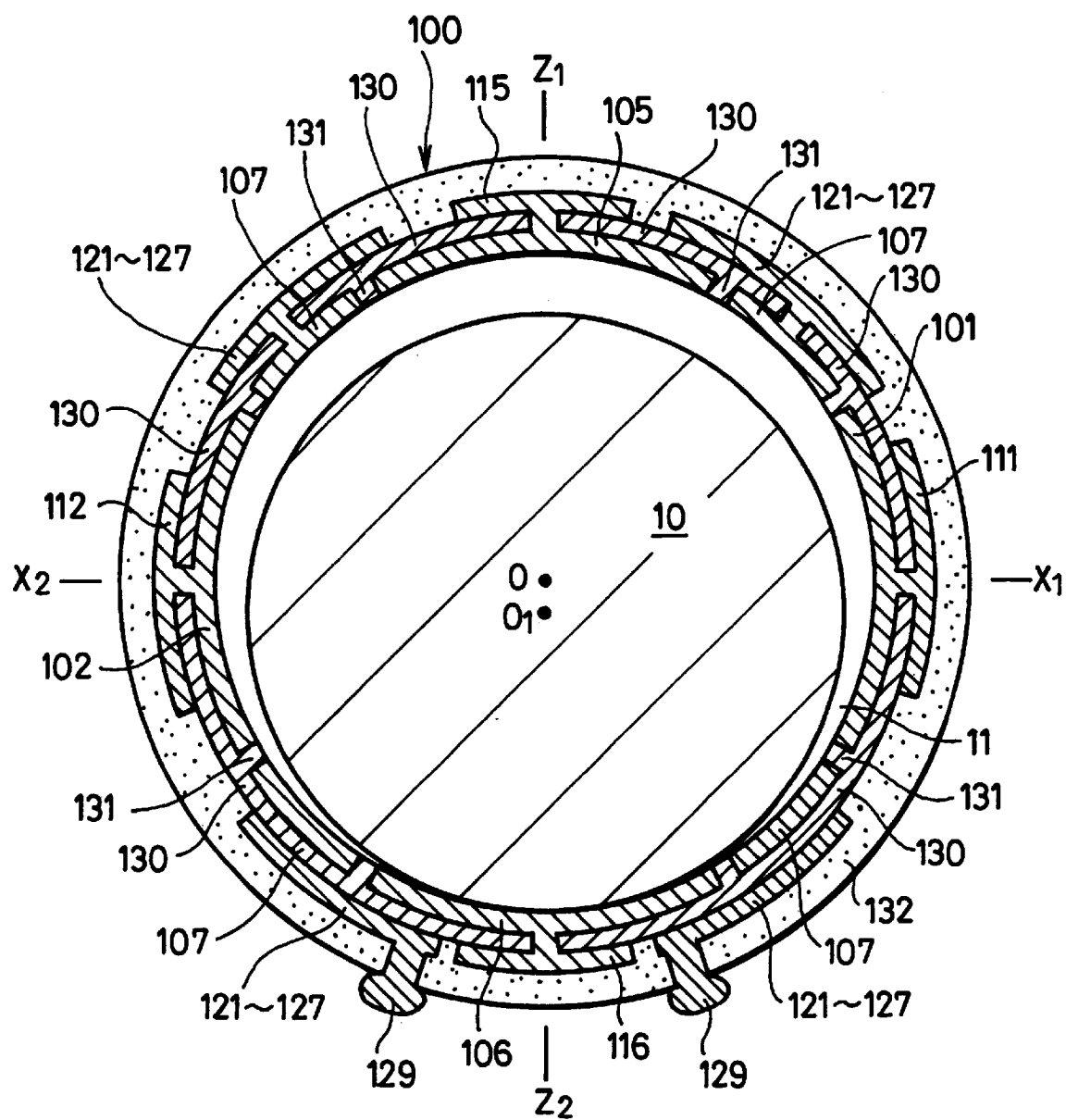
FIG. 1 is a cross sectional view of the inclinometer according to an embodiment of the present invention.

Referring to FIG. 1, an embodiment of inclinometer according to the present invention will be described. The inclinometer of the present embodiment has a spherical mass 10 and a spherical shell 100 which surrounds the mass 10. The outer diameter of the spherical mass 10 is a little smaller than the diameter of the spherical inner surface of the spherical shell 100. A cavity or gap 11 is created around the spherical mass 10. This gap 11 may be an open space or preferably a hermetic space. The gap may be evacuated or be filled with an appropriate inert gas or liquid.

The spherical mass 10 can move freely in the shell 100. When the inclinometer stands still, the spherical mass 10 (the center thereof is $o_1$) stops on the lowest point on the spherical inner surface of the spherical shell 100 (the center thereof is o). The diameter of the spherical mass 10 is less than several mm meters and, for example, may be 1 mm. The thickness of the gap 11 is the largest at the top of the spherical mass 10, but may be several $\mu$m in average.

The spherical shell 100 includes the innermost electrodes 101–106 and 107 (in FIG. 1, only electrodes 101,102,105, 106,and 107 are shown), subsequent insulating layer 130, further subsequent wiring patterns 111–117 and 121–127, and the outermost structure layer 132. The electrodes 101–106 and 107 are separated from one another by thin insulators 131 which are parts of the insulating layer 130, and each of the electrodes is electrically connected to the corresponding wiring pattern 111–117 or 121–127.

In the meanwhile, on the lower end of the spherical shell 100, bumps 129 are formed. The bumps 129 are mounted to the bores which are formed on the structure layer 132, and are connected to the wiring patterns 111–117 and 121–127.

The electrodes 101–106, 107 and the wiring patterns 111–117 and 121–127 are made of conductive material, for example, metal layer, and the insulating layer 130 and the insulators 131 are made of insulating material, for example, silicon dioxide $SiO_2$. The structure layer 132 is made of insulating material, for example, a thermosetting resin.

In the present embodiment, the thickness of the structure layer 132 is larger than those of the electrodes, wiring patterns and insulating layer. Accordingly, the structure layer 132 serves as a protection layer for protecting the inner components and at the same time, provides the spherical shell 100 with a structural strength.

Figure 2A:
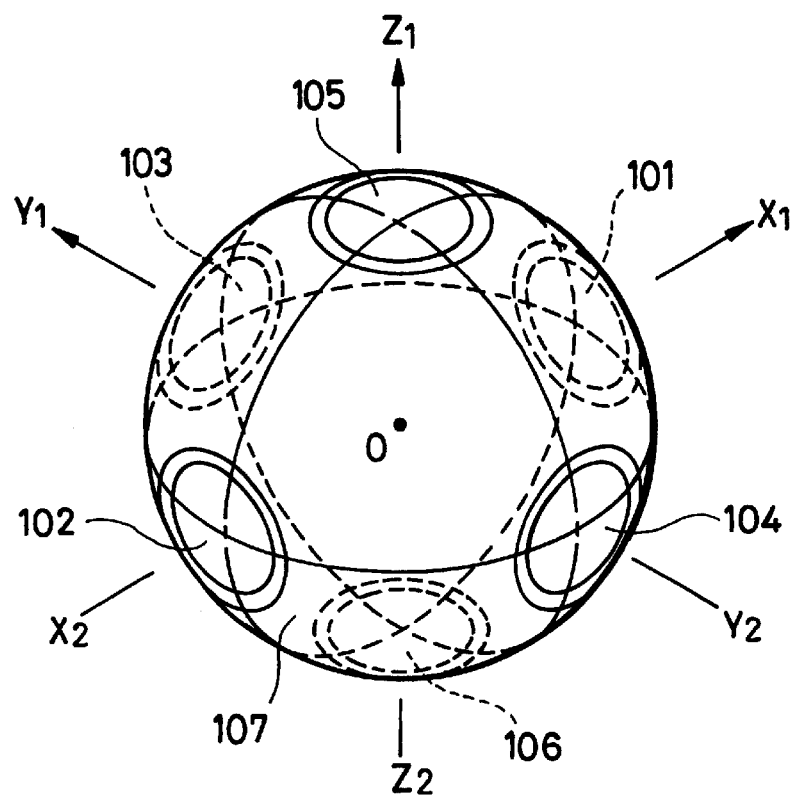
FIG. 2A is a perspective view of the electrodes of inclinometer according to the present invention.
Figure 2B:
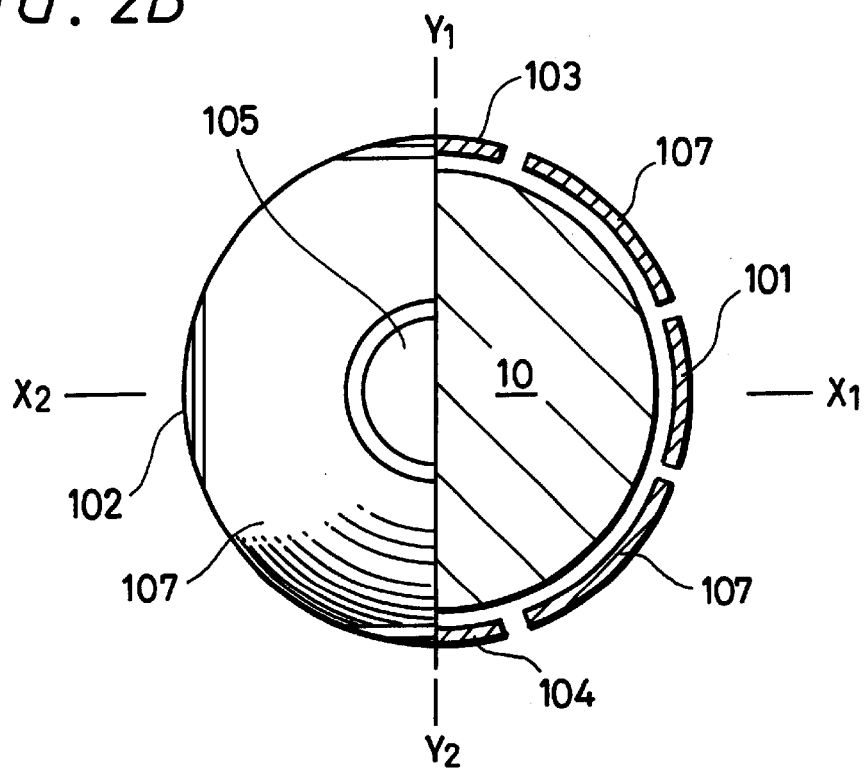
FIG. 2B is a cross sectional view of the spherical mass and the electrodes of inclinometer according to the present invention.

Referring to FIG. 2, only the spherical mass 10 and the electrodes 101–107 are shown and the other components of the spherical shell, for example, the insulating material layer 130, wiring patterns 111–117 and 121–127 and structure layer 132 are not shown in FIG. 2.

As shown in the drawing, the origin O is set at the center of the spherical shell 100, and orthogonal three axes passing through the origin O is set. When the inclinometer is positioned on a horizontal plane, $X_1$–$X_2$ axis and $Y_1$–$Y_2$ axis are set on the horizontal plane and the $Z_1$–$Z_2$ axis is set vertically.

According to the present embodiment, the electrodes include first and second inclination detection electrodes 101 and 102 along $X_1$–$X_2$ axis, third and fourth inclination detection electrodes 103 and 104 along $Y_1$–$Y_2$ axis, fifth and sixth inclination detection electrodes 105 and 106 along $Z_1$–$Z_2$ axis and a shield electrode 107 among these electrodes.

In this embodiment, the six inclination detection electrodes 101–106 are circular and the shield electrode 107 occupies the remainder of these six electrodes.

Figure 3A:
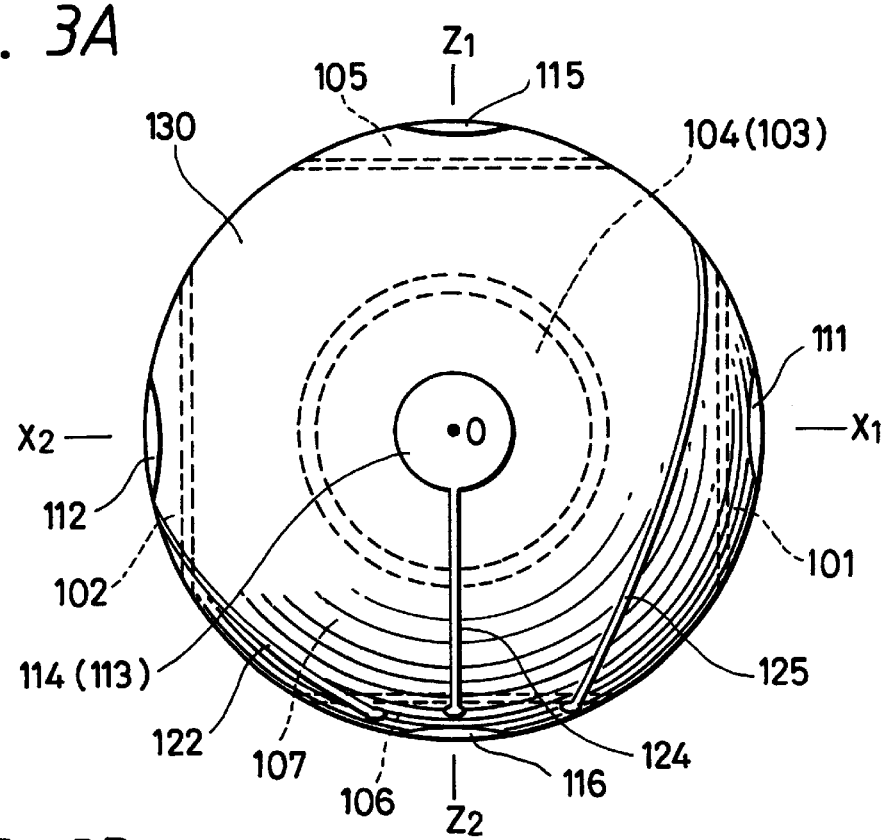
FIG. 3A is a side view of the inclinometer according to the present invention from which the structure layer is removed to show electrodes and circuit pattern.
Figure 3B:
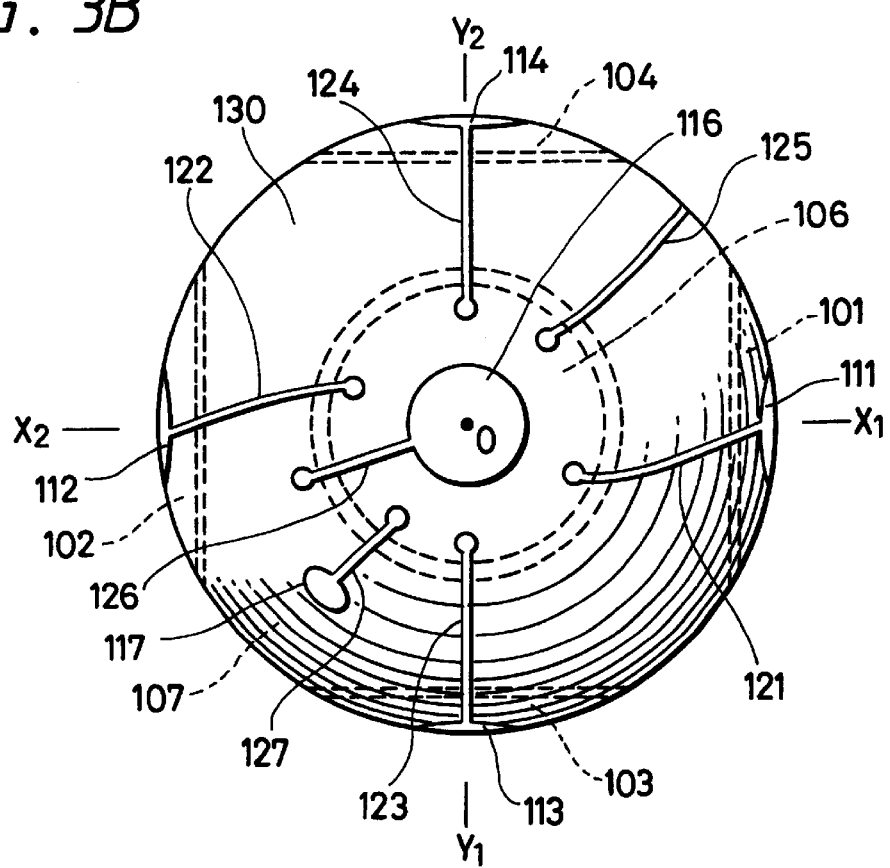
FIG. 3B is a bottom view of the inclinometer according to the present invention from which the structure layer is removed to show electrodes and circuit pattern.

Referring to FIG. 3, FIG. 3 is a perspective view of the spherical shell 100 of the inclinometer of FIG. 1, from which the structure layer 132 has been removed. FIG. 3A is a front view of inclinometer according to the present embodiment as seen along $Y_1$ axis and FIG. 3B is a bottom view thereof as seen along $Z_2$ axis. On the outer surface of the insulating layer 130, wiring patterns 111–117 and 121–127 are formed as described above. The wiring patterns include, as shown in the drawing, terminal patterns 111–116, 117 which are connected to the electrodes 101–106, 107 and circuit patterns 121–126, 127 which extend from these terminal patterns 111–116, 117.

As shown in FIG. 3B, the ends of these circuit patterns 121–126, 127 are concentrated on the lower part of the spherical shell 100. The ends of the circuit patterns 121–126, 127 are, for example, as shown in the drawing, positioned along a circle. The ends of the circuit patterns 121–126, 127 are connected to the bumps as shown in FIG. 1.

Figure 4A:
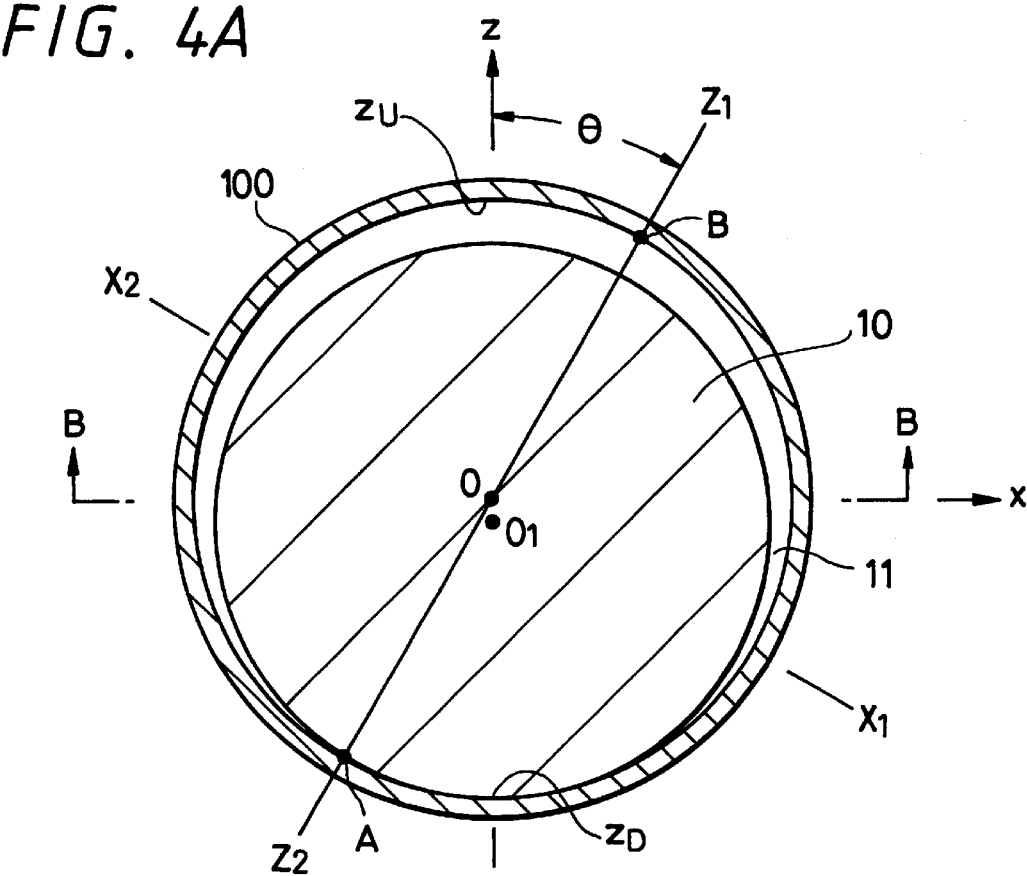
FIG. 4A and FIG. 4B are cross sectional views of the inclinometer according to the present invention to show the operation of inclinometer.
Figure 4B:
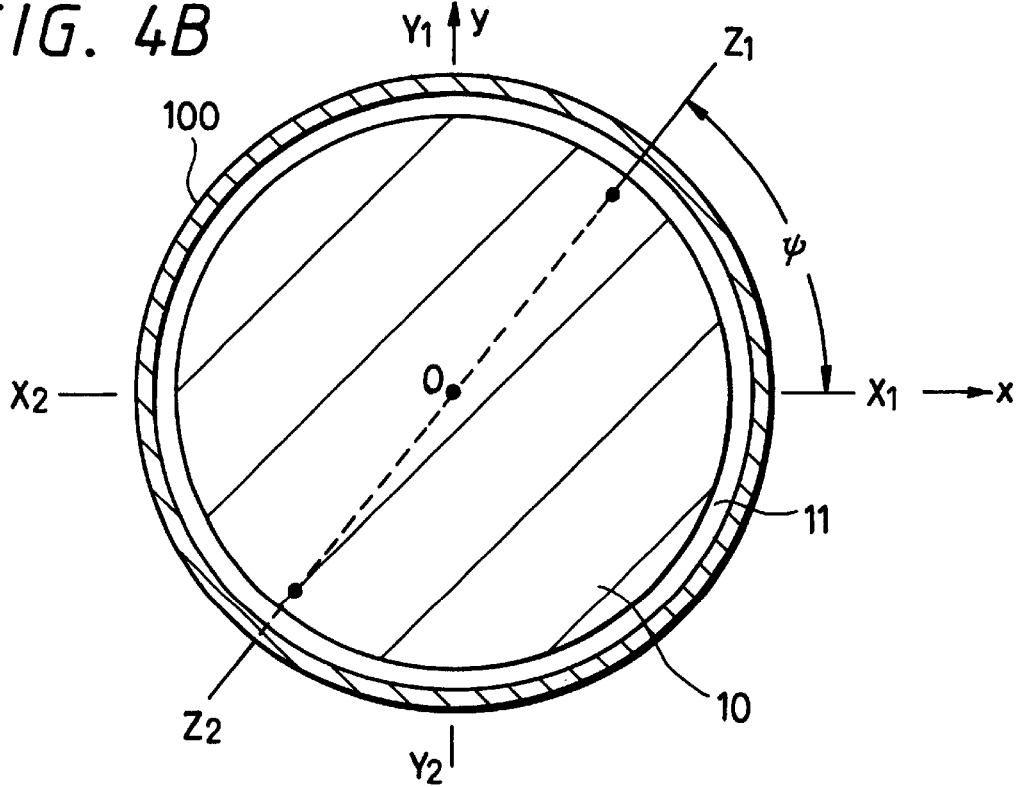
Figure 5:
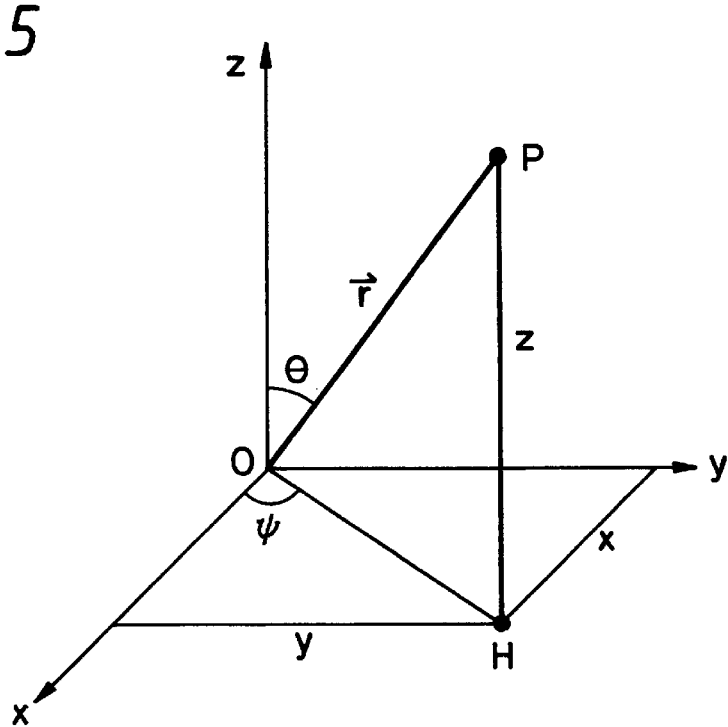
FIG. 5 is a perspective view of spherical polar coordinates.

Referring to FIG. 4 and FIG. 5, the operation of the inclinometer of the present embodiment will be described. As shown in the drawing, orthogonal three axes, namely, xyz axes are set in space. As shown FIG. 5, a point in the space can be represented by spherical polar coordinates (r, θ, ψ).

$$x = r\sin\theta\cos\psi$$

$$y = r\sin\theta\sin\psi$$

$$z = r\cos\theta$$

As described above, on the spherical shell 100, the orthogonal three axes, namely, $X_1$–$X_2$ axis, $Y_1$–$Y_2$ axis and $Z_1$–$Z_2$ axis have been set. One of these axes, for example, $Z_1$–$Z_2$ axis is selected as a reference axis of inclinometer. The inclination angle θ of the reference axis $Z_1$–$Z_2$ relative to a vertical axis or z-axis is the inclination angle of the inclinometer or the object to be measured.

According to the present invention, the inclination orientation or azimuth angle ψ as well as the inclination angle of reference axis $Z_1$–$Z_2$ can be detected.

The spherical mass 10 can move freely inside the spherical shell 100, but when it stands still, it stops at the lowest point on the inner surface of the spherical shell 100. As shown in the drawing, the points on which the reference axis $Z_1$–$Z_2$ crosses over the inner surface of the spherical shell 100 are designated as "A" and "B". When the inclination of reference axis $Z_1$–$Z_2$ is zero, the spherical mass 10 comes into contact with the spherical shell 100 at the lower cross point "A", and the largest gap can be created at the upper cross point "B".

If the reference axis $Z_1$–$Z_2$ is inclined relative to a vertical axis or z-axis, the contact point "$Z_D$" where the spherical mass 10 comes into contact with the spherical shell 100 is biased from the lower cross point "A". The deviation distance between the lower cross point "A" and the contact point "$Z_D$" between the spherical mass 10 and the spherical shell 100 is relative to the inclination angle θ. Similarly, if the reference axis $Z_1$–$Z_2$ is inclined relative to a vertical axis or z-axis, the point "$Z_U$" where the distance between the spherical mass 10 and the spherical shell 100 is maximum is biased from the upper cross point "B". The deviation distance between the upper cross point "B" and the point "$Z_U$" where the gap is maximum is relative to the inclination angle θ.

Accordingly, if the point on the inner surface of the spherical shell 100 with which the spherical mass 10 comes into contact, namely, the point $Z_D$ on which the gap between the spherical mass 10 and the spherical shell 100 is zero is detected, the inclination angle θ can be obtained. Similarly, if the point "$Z_U$" on the inner surface of the spherical shell 100 where the gap between the spherical shell 100 and the spherical mass 10 is maximum is detected, the inclination angle θ can be obtained. The point $Z_D$ where the gap is zero, or the point $Z_U$ where the gap is maximum can be known from output signals of the inclination detection electrodes.

Figure 6:
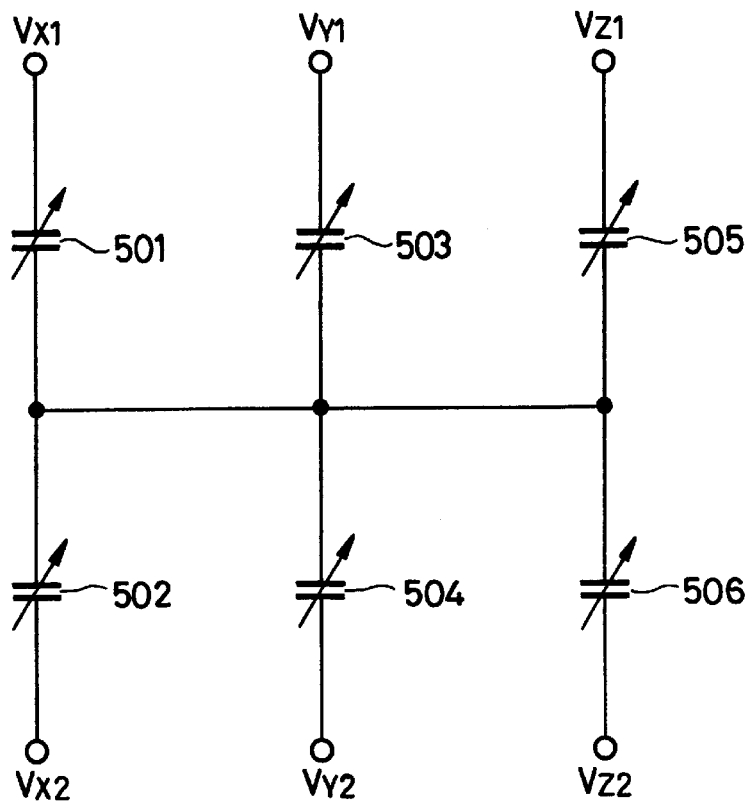
FIG. 6 is an equivalent circuit diagram of the inclinometer according to an embodiment the present invention.

Referring to FIG. 6, FIG. 6 shows an equivalent circuit in which the spherical mass 10 and six inclination detection electrodes 101–106 have been replaced by capacitors 501–506. The spherical mass 10 and the electrodes are made of conductive material and form capacitors. Electrodes 101–106 and the spherical mass may be coated with an appropriate nonconductive material. Electrostatic capacity of each capacitor varies depending on its gap. In other words, the electrostatic capacity of each capacitor varies depending on the distance between the spherical mass 10 and the inclination detection electrode by which the capacity is formed.

The change of electrostatic capacity of each capacitor 501–506 can be known by detecting the change of the voltages $V_{X1}$, $V_{X2}$, $V_{Y1}$, $V_{Y2}$, $V_{Z1}$, $V_{Z2}$ applied to each capacitor.

By detecting the electrostatic capacities of capacitors 501–506, the point $Z_D$ where the gap is zero or the point $Z_U$ where the gap is maximum on the inner surface of the spherical shell 100 can be known. If such zero point $Z_D$ or maximum point $Z_U$ is detected, the inclination angle and inclination azimuth of the reference axis $Z_1$–$Z_2$ can be obtained.

Figure 7A:
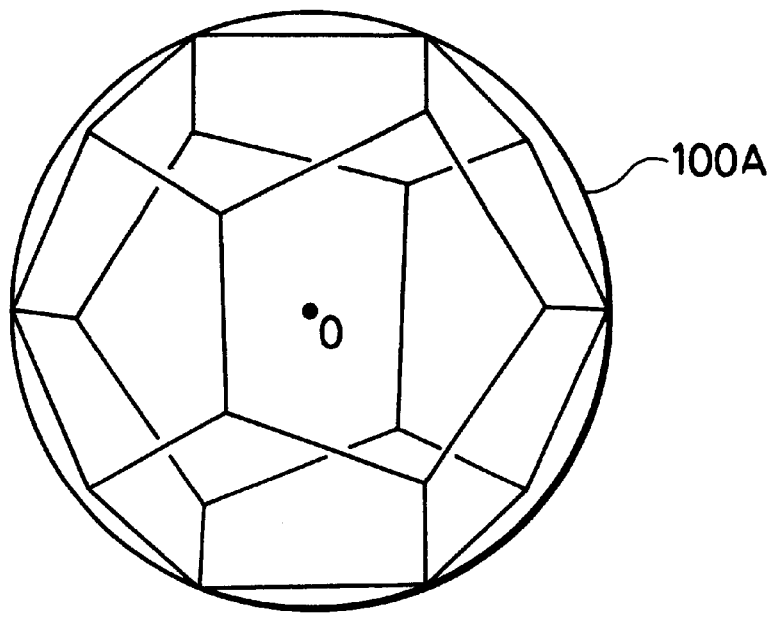
FIG. 7A and FIG. 7B are perspective views of regular polyhedrons to explain how to make electrodes of the inclinometer according to the present invention.
Figure 7B:
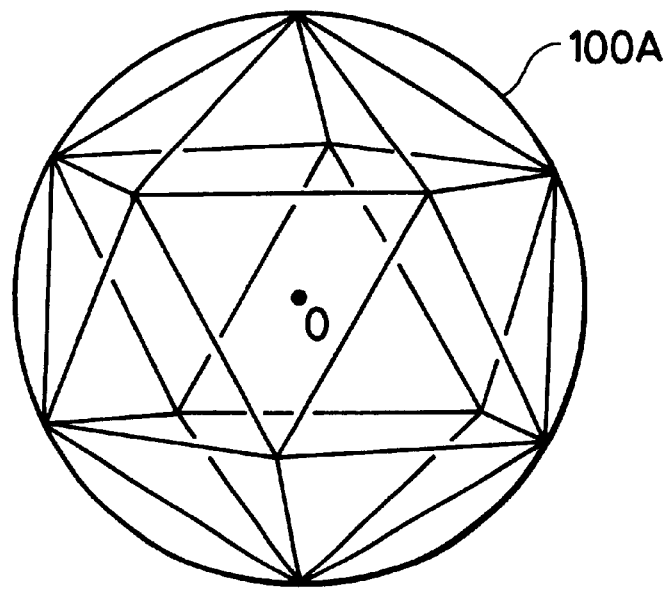

Referring to FIG. 7, other embodiments of inclination to detection electrodes will be described. The inclination detection electrodes are made preferably as point symmetry on the spherical inner surface of the spherical shell 100. Such a point symmetrical arrangement of the inclination detection electrodes may be formed for example by utilizing a regular polyhedron. It is assumed that a regular polyhedron is set to touch the inner surface 100A of the spherical shell 100. Then, a point light source is positioned at the center of the spherical shell 100 and the image of each surface of the regular polyhedron is projected on the inner surface 100A of the spherical shell 100 by the light irradiated from the light source. In this way, on the spherical inner surface of the spherical shell 100, electrodes can be formed corresponding to the shape of each surface of the regular polyhedron. In FIG. 7, a regular dodecahedron and a regular icosahedron are illustrated, but other regular polyhedrons can be used.

Figure 8:
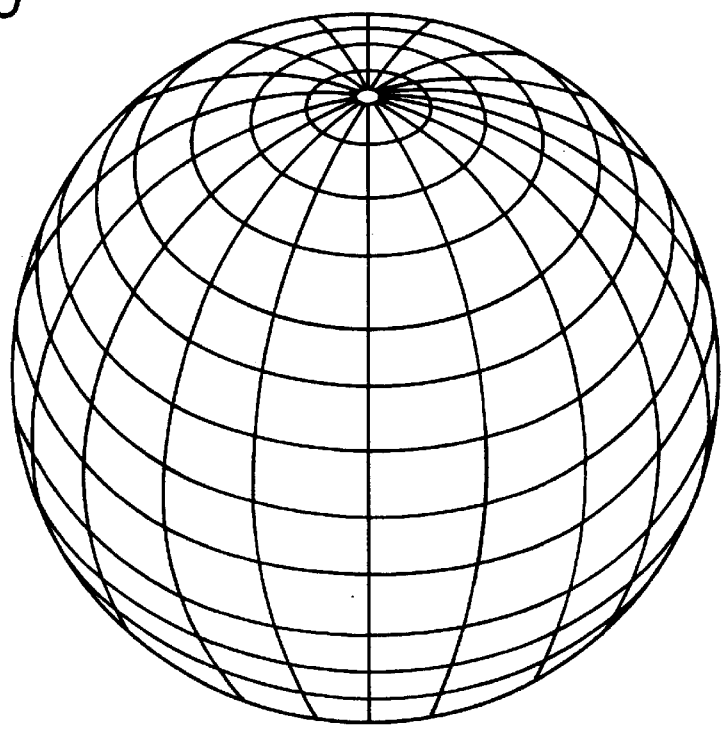
FIG. 8 is a perspective view of meshed electrodes of the inclinometer according to the present invention.

Referring to FIG. 8, another embodiment of inclination detection electrodes is described. In this embodiment, the inclination detection electrodes are formed in shape of mesh. On the inner surface of the spherical shell 100, a plurality of inclination detection electrodes are formed which are separated from one another by latitudinal partition lines and longitudinal partition lines. By using such a great number of mesh electrodes, the zero point $Z_D$ or the maximum point $Z_U$ can be easily detected.

Firstly, each of the mesh electrodes is designated by reference numeral and the latitude and longitude thereof are previously detected. The area of each mesh electrode is very small and the latitude and longitude of each electrode are represented by those of its center point. Namely, the contact point of the spherical mass 10 can be approximated to the center point of the electrode with which the spherical mass 10 is in contact. By detecting the number of the electrode with which the spherical mass 10 is in contact, the latitude and longitude of the electrode can be detected. The latitude and longitude of the electrode obtained by this way represent the inclination angle and inclination azimuth of the reference axis $Z_1$–$Z_2$.

Figure 10:
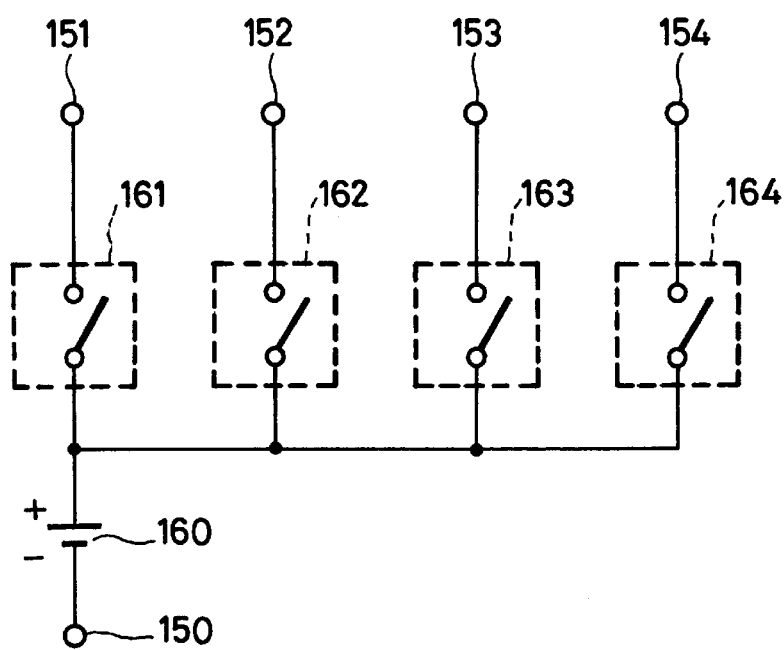
FIG. 10 is an equivalent circuit diagram of electrodes of the inclinometer of FIG. 9.
Figure 9A:
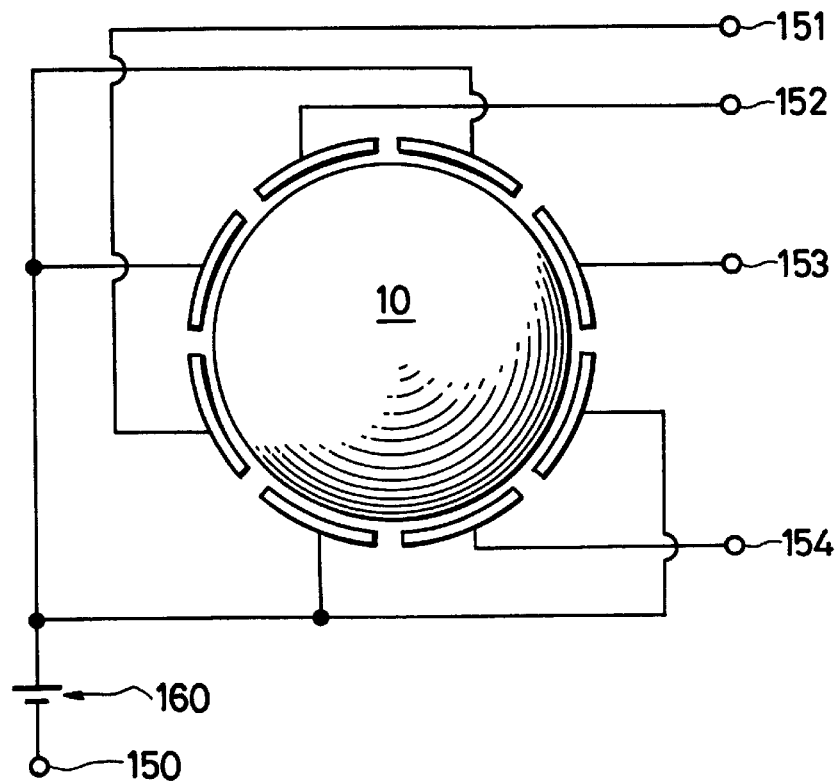
FIG. 9A and FIG. 9B are diagrams to show another embodiment of the inclinometer according to the present invention.

Referring to FIG. 9 and FIG. 10, another embodiment of inclinometer according to the present invention will be described. FIG. 10 shows an equivalent circuit of the spherical mass 10 and electrodes of the inclinometer of FIG. 9. The shape of the electrodes is not shown in this drawing, but any shape of electrodes in the above described embodiments may be used. According to this embodiment, pairs of electrodes each being positioned adjacent to each other form switches 161–164. One of each pair is connected to a direct current power 160 and the other is connected to output terminals 151,152,153,154 for detecting voltages.

Figure 9B:
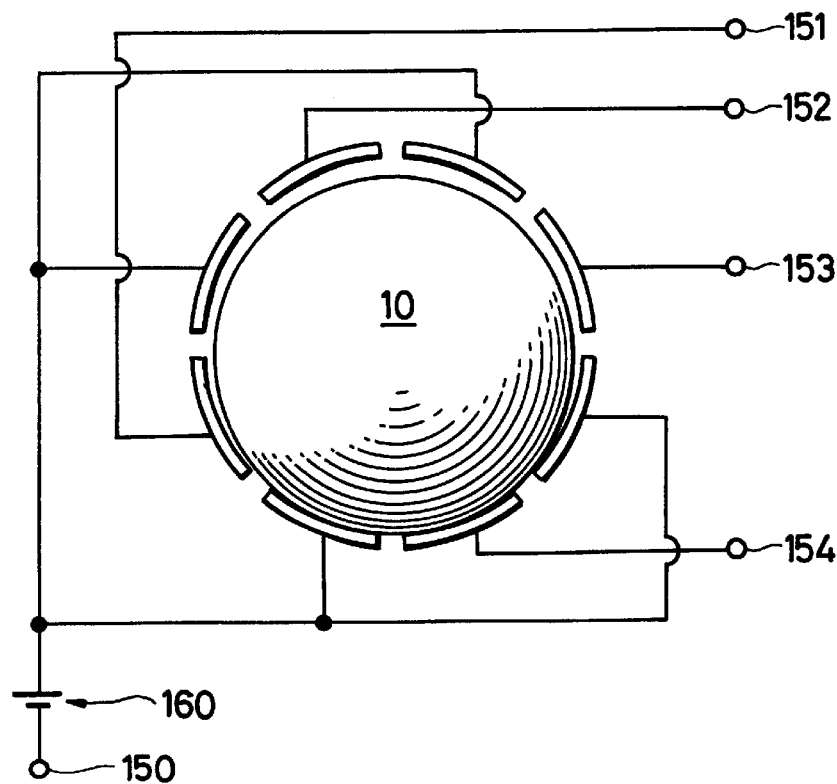

The spherical mass 10 and electrodes or their surfaces are made of conductive material. As shown in FIG. 9B, when the spherical mass 10 comes into contact with a pair of adjacent electrodes at the lowest portion of the sphere when viewed from the perspective of FIG. 9B, the pair of electrodes are electrically connected to each other. Namely, the switch which is formed by the pair of adjacent electrodes at the lowest portion is turned to "on".

It is the lowest electrodes that come into contact with the spherical mass 10. Namely, only one switch is turned to "on" by the spherical mass 10 and the other switches are "off". Accordingly, if the switch which is "on" is detected, the lowest electrodes can be known. Further, if the lowest electrodes are known, the inclination angle and inclination azimuth of the reference axis can be detected as described above.

As described above, if the spherical mass 10 comes into contact with two electrodes at the lowest, the switch corresponding to the two electrodes is turned to "on". However, if the spherical mass 10 comes into contact with only one electrode, no switch is "on". In such a case, the inclinometer should be moved slightly until the spherical mass 10 comes into contact with two electrodes and the switch formed by the two electrodes is turned to "on".

Although embodiments of the present invention are described above, it should be understood by one skilled in the art that the present invention is not limited by the above described embodiments and various other compositions can be taken without departing from the scope of the claims.

According to the present invention, it is advantageously possible to manufacture a micro inclinometer comprising a spherical mass and electrodes which are positioned around and in close vicinity with the mass.

What is claimed is:

1. An electronic device comprising:
   a spherical element;
   a spherical shell surrounding said spherical element; and
   at least three electrodes proximate to the inner surface of the spherical shell, wherein one electrode is positioned to enable a three dimensional position of the spherical element relative to the shell to be calculated by measuring a first capacitance between the one electrode and the spherical element and a second capacitance between any other electrode and the spherical element;
   wherein a surface area of the one electrode covers a majority of the remaining surface not covered by the other electrodes.

2. The electronic device of claim 1 wherein a surface area of the one electrode is evenly distributed around the shell.

3. An electronic device comprising:
   a spherical element;
   a spherical shell surrounding said spherical element; and
   at least three electrodes proximate to the inner surface of the spherical shell,
   wherein a surface area of one electrode surrounds the other electrodes.

4. The electronic device of claim 3 wherein the surface area of the at least one electrode covers a majority of the remaining surface not covered by the other electrodes.

5. The electronic device of claim 3 further comprising a measuring means operable to calculate a three dimensional position of the spherical element using at least a first electrostatic capacity between the spherical element and the one electrode, and a second electrostatic capacity between the spherical element and at least one of the other electrodes.

6. An electronic device comprising:
   a spherical element;
   a spherical shell surrounding said spherical element; and
   at least three electrodes proximate to the inner surface of the spherical shell,
   wherein a surface area of one electrode covers a majority of the remaining surface not covered by the other electrodes.

7. The electronic device of claim 6 wherein the surface area of the one electrode is substantially evenly distributed around the shell.

8. The electronic device of claim 7 wherein the one electrode is a shield electrode.

9. An inclinometer comprising
   a spherical mass;
   a spherical shell surrounding said spherical mass and having a reference axis; and
   a plurality of electrodes mounted on the spherical inner surface of said spherical shell, the plurality of electrodes including at least two detection electrodes and a shield electrode, wherein a surface area of the shield electrode is evenly distributed around the shell so as to substantially surround the detection electrodes;
   said inclinometer applied to detect the inclination angle of said reference axis by the output signals of said electrodes, wherein said inclination angle of said reference axis is calculated by using a first electrostatic capacity between said spherical mass and said shield electrode, and a second electrostatic capacity between said spherical mass and at least one of said detection electrodes.

10. The inclinometer of claim 9 wherein the shield electrode occupies a majority of the inner surface of the spherical shell that is not occupied by the detection electrodes.

11. The inclinometer of claim 9 wherein the position of the spherical mass can be calculated in three dimensions.

12. The inclinometer of claim 9 wherein the spherical mass is less than several millimeters in diameter.

13. The inclinometer of claim 12 wherein the spherical mass is approximately one millimeter in diameter.

14. An electronic device comprising:
- a spherical element;
- a spherical shell surrounding said spherical element; and
- at least three electrodes proximate to the inner surface of the spherical shell,
- wherein at least one of the three electrodes has a surface area that is evenly distributed around the shell.

15. The electronic device of claim 14 wherein the surface area of the at least one electrode substantially surrounds the other electrodes.

16. The electronic device of claim 14 wherein the electronic device is an inclinometer.

17. The electronic device of claim 14 further comprising a gap defined by an outer surface of the spherical element and the inner surface of the shell, wherein the gap is at most several microns wide.

18. The electronic device of claim 17 wherein the gap is at least partially filled with a fluid.

19. The electronic device of claim 17 wherein the spherical element is less than several millimeters in diameter.

* * * * *